United States Patent [19]

Allen

[11] 4,075,031
[45] * Feb. 21, 1978

[54] TIO$_2$ PIGMENT COATED WITH DENSE SILICA AND POROUS ALUMINA/SILICA

[75] Inventor: Alvin Allen, Claymont, Del.

[73] Assignee: E. I. Du Pont de Nemours and Company, Wilmington, Del.

[ * ] Notice: The portion of the term of this patent subsequent to July 29, 1992, has been disclaimed.

[21] Appl. No.: 728,413

[22] Filed: Sept. 30, 1976

[51] Int. Cl.$^2$ .................................................. C09C 1/36
[52] U.S. Cl. .................................. 106/300; 106/308 B
[58] Field of Search ............................ 106/300, 308 B

[56] References Cited

U.S. PATENT DOCUMENTS

| | | | |
|---|---|---|---|
| 3,437,502 | 4/1969 | Werner | 106/300 |
| 3,510,335 | 5/1970 | McGinnis | 106/300 |
| 3,897,261 | 7/1975 | Allen | 106/300 |
| 3,928,057 | 12/1975 | De Colibas | 106/300 |

Primary Examiner—J. Poer
Assistant Examiner—J. V. Howard

[57] ABSTRACT

A coated titanium dioxide pigment and the process for its preparation consisting essentially of a core of pigmentary titanium dioxide (TiO$_2$), a dense inner coating of dense amorphous silica (SiO$_2$) in an amount from 1 to 10% by weight, based on the uncoated pigment, and, optionally, up to 15% of alumina (Al$_2$O$_3$) and a porous outer coating of porous silica (SiO$_2$) and alumina (Al$_2$O$_3$), said porous silica being present in an amount from 0.5 to 15% by weight and said alumina being present in an amount from 0 to 15% by weight, based on the uncoated pigment. As a component of coating compositions, this pigment provides a high degree of hiding power and durability for indoor and outdoor applications.

10 Claims, No Drawings

TIO₂ PIGMENT COATED WITH DENSE SILICA AND POROUS ALUMINA/SILICA

BACKGROUND OF THE INVENTION

The treatment of pigmentary titanium dioxide ($TiO_2$) in the rutile or anatase form with hydrous oxides, especially silica and alumina, is known in the art to provide resistance to chalking and discoloration in paints, good opacity in paper and good hiding power in flat paints. Typical application techniques for applying silica are taught in U.S. Pat. Nos. 2,885,366; 2,387,534; and 2,296,636. Generally, the silica is applied to the pigment by precipitation from sodium silicate with acid in an aqueous slurry of the pigment. The resulting pigments, having a dense, i.e., non-porous silica coating, have good durability but do not provide as high a degree of hiding power as is desirable in many paint compositions. Applying a loose, i.e., porous, alumina to dense silica-coated $TiO_2$ according to the process taught in U.S. Pat. No. 3,437,502 improves the dispersibility of dense silica-coated $TiO_2$ without sacrificing durability, but does not significantly enhance the hiding power of the dense silica-coated $TiO_2$.

Applying a porous coating consisting essentially of alumina and silica to pigmentary titanium dioxide according to the process taught in U.S. Pat. No. 3,591,398 provides a coated pigment having generally better hiding power than the densely coated pigment, but lower durability than is desired for many applications. A further increase in hiding power is achieved by treating $TiO_2$ with four applications consisting of porous silica and alumina followed by additional applications of porous silica and alumina, as described in U.S. Pat. No. 3,897,261. While the $TiO_2$ pigments resulting from the multiple treatment described in U.S. Pat. No. 3,897,261 exhibit improved hiding power and somewhat improved durability, the durability achieved falls far short of that exhibited by densely coated pigments.

One method to achieve a high degree of durability and hiding power is disclosed in U.S. Pat. No. 3,649,322 wherein pigmentary $TiO_2$ is coated with a dense skin of hydrated aluminum silicate and optionally an additional coating of porous alumina on the dense skin.

This invention provides for a pigmentary $TiO_2$ coated in such a way as to combine the durability of dense silica coatings with the hiding power of loose hydrous coatings.

For purposes of this application pigmentary means that the material is pulverulent and of good whiteness with an average particle diameter of from about 0.15 to about 0.3 micron.

SUMMARY OF THE INVENTION

This invention provides for a coated $TiO_2$ pigment consisting essentially of a core of pigmentary $TiO_2$, a dense inner coating of from 1 to 10% by weight of dense amorphous silica, calculated as $SiO_2$, and based on the uncoated pigmentary $TiO_2$, and from 0 to 15% by weight of alumina, calculated as $Al_2O_3$, and based on the uncoated pigmentary $TiO_2$, and a porous outer coating of porous silica and alumina. The porous silica in the porous outer coating is present in an amount from 0.5 to 15% by weight, calculated as $SiO_2$, and based on the uncoated pigmentary $TiO_2$, and the alumina in the porous outer coating is present in an amount from 0 to 15% by weight, calculated as $Al_2O_3$, and based on the uncoated pigmentary $TiO_2$. In addition, alumina must be present in either the inner or outer coating in an amount of at least 0.5%. In other words, the total amount of alumina must be at least 0.5%. The preferred amount of dense amorphous silica in the dense inner coating is from 3.5 to 6% by weight. When alumina is present in the dense inner coating the preferred amount is from 1 to 3% by weight. In the porous outer coating it is preferred that from 5 to 10% by weight of porous silica and from 5 to 10% by weight of alumina be present.

In accordance with the present invention there is provided a process for preparing coated $TiO_2$ pigment by the steps of (i) adjusting the pH of an aqueous slurry of pigmentary $TiO_2$ to from about 9 to 10, (ii) adding to said slurry an aqueous solution of soluble silicate in an amount calculated to provide from 1 to 10% by weight of silica, calculated as $SiO_2$, and based on said pigmentary $TiO_2$, (iii) slowly adding dilute aqueous acid to said slurry until the pH of said slurry is from 6 to 7.7, (iv) adding to said slurry, maintained at a pH from 5 to 9, an aqueous solution of a soluble silicate in an amount calculated to provide from 0.5 to 15% by weight of silica, calculated as $SiO_2$, and based on said pigmentary $TiO_2$, (v) adding to said slurry, maintained at a pH from 4 to 9, an aqueous solution of soluble aluminate in an amount calculated to provide from 0.5 to 15% by weight of alumina, calculated as $Al_2O_3$, and based on said pigmentary $TiO_2$, (vi) adjusting the pH of said slurry to from 7 to 9, and (vii) separating the resulting coated $TiO_2$ pigment from said slurry. To incorporate alumina in the inner coating as well as in the outer coating, the above-described process comprises the additional step (iiia) of adding to said slurry, after step (iii) and prior to step (iv), an aqueous solution of soluble aluminate in an amount calculated to provide from 0.5 to 15% by weight of alumina, calculated as $Al_2O_3$, and based on said pigmentary $TiO_2$, while the pH of said slurry is maintained from 4 to 9. If it is desired to incorporate alumina in the inner coating alone, steps (i), (ii), (iii), (iiia), (iv), (vi), and (vii) are followed, eliminating step (v) which involves the incorporation of alumina in the outer coating.

The order of process steps (iv) and (v) is not particularly critical in that a suitably coated pigment results when the order of these steps is reversed or performed simultaneously.

Although curing the slurry at various stages in the process is not essential to the attainment of good pigment properties, in applications where curing is deemed desirable the slurry can be cured, for example, at temperatures of at least 40° C., and preferably at least 70° C., for at least 15 minutes, and preferably at least 30 minutes, after any or all of process steps (i), (iii), (iiia), (iv), and (v).

DETAILED DESCRIPTION OF THE INVENTION

The base titanium dioxide pigment may be prepared by the high temperature vapor phase oxidation of $TiCl_4$, the vapor phase hydrolysis of $TiCl_4$, or the hydrolysis of colloidally seeded sulfuric acid solutions of titaniferous raw materials such as ilmenite. The hydrolysate of the sulfuric acid process must be washed and calcined to develop the crystalline characteristic and particle size needed for the good light scattering characteristics of pigments. The titanium dioxide pigment is processed according to the invention as an aqueous slurry. The pH of the slurry must be from 9 to 10 prior to the addition of a soluble silicate and the temperature of the slurry should be from 80° C. to 90° C. The temperature of 80° C. to 90° C. should be maintained throughout the processing. The slurry should be agitated throughout the precipitation of both the silica and the alumina to insure general uniformity of the pH conditions within the specified ranges.

Any soluble silica may be used in the process including sodium or potassium silicate. Commercially available water soluble sodium silicates with $SiO_2/Na_2O$ weight ratios from about 1.6 to about 3.75 and varying from 32 to 54% by weight of solids, with or without further dilution are the most practical. To apply dense amorphous silica to the pigmentary $TiO_2$ the slurry must be basic during the addition of the effective portion of the soluble silicate, then slowly acidified over a period of preferably at least 45 minutes until a pH from about 6 to 7.7 is reached. It is preferred that slow acidification be practiced utilizing a dilute aqueous acid having a normality of less than about 4. To apply a porous silica to the coated pigment the slurry should preferably be acid during the addition of the effective portion of the soluble silicate. The acid used may be any acid, such as HCl, $H_2SO_4$, $HNO_3$ or $H_3PO_4$ having a dissociation constant sufficiently high to precipitate silica and used in an amount sufficient to maintain an acid condition in the slurry. Compounds such as $TiOSO_4$ or $TiCL_4$ which hydrolyze to form acid may also be used. Alternative to adding all the acid first, the soluble silicate and the acid may be added simultaneously so long as the acidity of the slurry is preferably maintained at a pH of below about 7.5. After addition of the acid, the slurry should be maintained at a temperature from 80° C. to 90° C. for at least 30 minutes before proceeding with further additions.

The alumina of the inner coating or outer coating must be precipitated in an environment having a pH from about 4 to about 9. To avoid subjecting the treated pigment to unduly acid or alkaline conditions, a pH from about 6 to 8 is preferred. For purposes of this invention it is preferable to add about 75% of the total desired alumina as sodium aluminate, while maintaining the slurry pH between about 6 and 8. The remainder of the sodium aluminate can be added, allowing the slurry pH to rise to between about 8 and 9.

This process may be applied to $TiO_2$ pigments which have been previously treated with oxides such as titania, but their presence is not essential to the benefits herein obtained. After treatment according to this process the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase. The process provides a method for obtaining good hiding power and good durability in titanium dioxide pigments for both indoor and outdoor applications.

While the invention is not intended to be bound by a theory of operation, it is believed that the combination of high hiding power and superior durability exhibited by the multiple coated $TiO_2$ pigments of the invention is due to the nature of the coatings. The conventional durable $TiO_2$ pigment containing a single coating of dense silica and alumina appears under micrographic examination to consist of $TiO_2$ particles having a more or less continuous smooth coating of dense silica in loose association with irregular masses of alumina. That is, aggregates of alumina appear to be dispersed throughout the pigment particles without a continuous close association with a particular pigment particle or group of particles. The conventional high hiding $TiO_2$ pigments, containing two or more coatings of porous silica and alumina lack the smooth, continuous coating of dense silica, but exhibit even larger masses of material, i.e., porous silica and alumina, dispersed throughout the $TiO_2$ pigment particles. It is believed that the continuous coatings provide durability and the porous silica and/or alumina provide hiding power.

In contrast, micrographic examination of the $TiO_2$ pigments of the invention reveals that the $TiO_2$ pigment particles are each substantially continuously coated with both dense silica and irregular masses of porous silica and alumina. While some unassociated masses of porous silica and alumina exist in a given sample, the amount is so small as to be considered negligible. Consequently, it is believed that the high durability is attributed primarily to the continuous nature of the dense and porous coatings and the high hiding power to the presence of the porous coatings.

DESCRIPTION OF TESTS

In the examples which follow, the test results are obtained by the procedure described below.

Acid Solubility

Acid solubility of the coated $TiO_2$ pigments of this invention is measured by digesting a predetermined quantity of coated pigment in sulfuric acid and spectrophotometrically comparing it to a standard $TiO_2$ sample similarly treated. The standard spectrophotometric curve is prepared as follows: a standard solution is prepared by dissolving 15 g. of ammonium sulfate and 1.0118 g. of $TiO_2$, containing 98.83% by weight $TiO_2$, in 20 ml. of 66° Be. sulfuric acid and diluting to 800 ml. with water. Eighty milliliters of the sulfuric acid solution is then added to this solution. After allowing the resulting solution to cool to room temperature, it is diluted to one liter with water. The solution contains 0.001 g. of $TiO_2$ per ml. and should be allowed to stand for one week before using.

Samples of 2, 4, 6 and 8 ml. of the above-prepared standard solution are each mixed with 10 ml. of 30% hydrogen peroxide and diluted to 100 ml. with 10% sulfuric acid. After standing for 1 hour, the absorbance of these solutions is read using a Beckman Model DK, DU or B Spectrophotometer against a reference solution, prepared by diluting 10 ml. of 30% hydrogen peroxide to 100 ml. with 10% sulfuric acid at 400 m$\mu$ using 10 mm. cells. A plot of titanium peroxide concentration in mg./l. versus optical density is made for these samples.

To determine acid solubility of the coated $TiO_2$ pigments, 0.2000 g. of coated $TiO_2$ pigment is added with stirring to 10 ml. 66° Be. sulfuric acid at 175° C. The pigment is digested at 175° C. for 1 hour. After digestion the sample is quenched by pouring into crushed ice, made from distilled water. The sample is diluted to 100 ml. with water and filtered. Ten milliliters of the filtrate is mixed with 2 ml. of 30% hydrogen peroxide and diluted to 25 ml. with 10% sulfuric acid. After one hour the absorbence of the sample is read against a reference solution, prepared by diluting 2 ml. of 30% hydrogen peroxide to 25 ml. with 10% sulfuric acid.

The concentration of soluble $TiO_2$ is determined from the above-prepared standard spectrophotometric curve from the measured optical density and the percent soluble $TiO_2$, i.e., the acid solubility, is calculated by dividing the concentration of soluble $TiO_2$ by 8.

Tinting Strength

The tinting strength test compares the green reflectance of paints which contain the same ratio of $TiO_2$ pigment to tinting gel. Although any color tint could be used for this test, green or blue tints are preferred because the eye is more sensitive to changes in strength with these colors. The tinting gel is prepared by mixing the following ingredients:

|  | Parts by Weight |
|---|---|
| Distilled water | 77.6 |
| A commercially available organic pigment sold by the Du Pont Company under the Trade Name Monastral® Green B | 20.0 |
| Hydroxyethyl cellulose | 2.4 |

Ten grams of the above-described tinting gel is mixed with 100 g. of paint. The paint is a conventional indoor water-based emulsion paint containing 2.5 lbs./gal. (0.36 kilograms/liter) $TiO_2$ pigment, about 1.4 lbs./gal. (0.19 kilograms/liter) of extender pigment and about 2.3 lbs./gal. (0.20 kilograms/liter) of vinyl acetate-ethylene emulsion. The pigment volume concentration of this paint is about 50%. The $TiO_2$ pigment used in the standard paint is a commercial $TiO_2$ pigment produced by the vapor phase oxidation of $TiCl_4$ and treated with $Al_2O_3$ and $SiO_2$ according to the procedure of Angerman U.S. Pat. No. 3,591,398. This $TiO_2$ pigment is designated as Control B in Tables I and II.

A film of prepared paint is drawn on white lacquered paper using a draw-down blade with 0.008 inch (0.020 cm.) clearance. The film is dried for at least two hours. The reflectance of the dried film is measured using a green filter on Neotec Du-Color Model 220 Reflectometer. From the value of this reflectance, $R_\infty$, the value of the ratio of the absorption coefficient, K, to the scattering coefficient, S, is found using the Kubelka-Munk Table (D. B. Judd and G. Wyszecki, "Color in Business, Sicence, and Industry", John Wiley, Dr. Sans, 1963, Appendix D). Values beyond the range shown in the Table can be calculated by $$K/S = \frac{(1 - R_\infty)^2}{2R_\infty}$$

Expressing the tinting strength on a relative basis, a value of 100 is assigned as the tinting strength of the standard. The relative value for the sample is calculated as follows:

$$\text{Relative Tinting Strength} = \frac{(K/S) \text{ Standard}}{(K/S) \text{ Sample}} \times 100$$

Hiding Power

The indoor hiding power is determined using a conventional indoor water-based emulsion paint containing 3 lbs./gal. (0.36 kilogram/liter) of $TiO_2$ pigment, about 1.6 lbs./gal. (0.19 kilogram/liter) of silicate extenders and about 1.7 lbs./gal. (0.20 kilogram/liter) of vinyl acrylic resinous binder in an aqueous emulsion. The $TiO_2$ pigment volume concentration of this paint is about 49%, the remaining 51% by volume of solids consisting essentially of silicate extenders and benders. The $TiO_2$ pigment used in the standard indoor paint is the commercial $TiO_2$ pigment used for the tinting strength test described above.

The outdoor hiding power is determined using a conventional outdoor paint and a commercial $TiO_2$ pigment produced by the vapor phase oxidation of $TiCl_4$ and treated with dense amorphous silica and alumina according to the procedure of Werner U.S. Pat. No. 3,437,502. This outdoor standard $TiO_2$ pigment is designated as "Control A" in Tables I and II.

The conventional outdoor paint used is a water-based emulsion containing about 2.5 lbs./gal. (0.30 kilogram/liter) of $TiO_2$ pigment, about 2.0 lbs./gal. (0.24 kilogram/liter) of magnesium silicate (talc) extender, and about 4.6 lbs./gal. (0.55 kilograms/liter) of an acrylic emulsion (50% by weight of solids). The $TiO_2$ pigment volume concentration of this paint is about 18.5% and the total pigment volume concentration is about 40%.

A film of prepared paint is drawn on a Morest Chart Form 09, a glossy paper chart having black and white areas, using a draw-down blade with an 0.0025 inch (0.0064 cm.) clearance, at 50% R.H. and 72° F. (22° C.). When the film is dried, the reflectances over the white and black backgrounds are measured using a Neotec Du-Color Model 220 Reflectometer using a green filter. One reading is taken on each of two "white" and "black" sections of each of four charts.

The scattering power (SX) is determined, using the above-measured reflectances, from the appropriate Kubelka-Munk Opacity Chart (D. B. Judd, "Optical Specification of Light Scattering Materials", *Journal of Research of the National Bureau of Standards*, Vol. 19, 1937, p. 287).

The relative hiding power (H.P.) of the samples is calculated as:

$$H.P. = \frac{SX \text{ of sample}}{SX \text{ of standard}} \times 100$$

The titanium dioxide used in all the following examples is produced by the vapor phase oxidation of titanium tetrachloride. The percentage compositions of alumina and silica, referred to hereinunder and elsewhere in the specification, are by weight, based on the weight of the $TiO_2$ pigment, and are calculated as $SiO_2$ and $Al_2O_3$, respectively, unless otherwise specified.

Chalk/Fade Index

The determination of chalk/fade index is in accordance with the procedure described by W. H. Daiger and W. H. Madson in Vol. 39, July 1967, of the *Journal of Paint Technology*, pp. 399–410. Specifically, the tests used for obtaining data in this application are made on paints of the following formulation:

|  | Grams |
|---|---|
| $TiO_2$ pigment | 48.0 |
| Blue organic pigment (a commercial organic pigment sold by the Du Pont Company under the name "Rampo" Blue BP-366-D) | 6.0 |
| Alkyd resin (a commercial resin sold by Celanese Coatings Company under the name "Syntex" 3533, 50% N.V.) | 120.0 |
| Organic solvent, boiling range 160° C. – 193° C. (commercial solvent sold by Humble Oil and Refining Co. under the name "Varsol" #1) | 36.0 |
| Xylene | 36.0 |
| 24% Pb naphthenate drier | 0.75 |
| 6% Co naphthenate drier | 0.40 |

-continued

| | Grams |
|---|---|
| 6% Mn naphthenate drier | 0.20 |

These ingredients are ground in a rotating glass jar containing 400 g. of 0.5 inch (1.27 cm.) glass balls for about 42 hours and the resulting paint sprayed, without reduction, onto aluminum panels for exposure tests. Control panels prepared using the standard outdoor pigment described above are placed in each set for exposure.

Degradation on exposure causes the blue to become white due to chalking. The degree of degradation is measured by recording the red reflectance at various intervals. Red reflectance increases as the chalking progresses. To determine the index numbers reported, the panels are exposed outdoors until the instrument gives a fixed reading, arbitrarily set to indicate a well-defined degree of chalking. The chalk/fade index is the ratio of time units required for the test sample to reach this reflectance divided by the time units required by the control times 100. The instrument used is a spectrophotometer adapted to read light intensity reflected from the panel surface through a red filter having a peak transmission at about 5760 A.

EXAMPLES 1-18 AND CONTROLS

Three thousand grams of pigmentary $TiO_2$ is slurried in sufficient water to achieve 300 g. $TiO_2$ per liter. The slurry is heated to 90° C. and the pH is adjusted to 9.5 with a 50% by weight aqueous solution of sodium hydroxide. At this temperature a solution of sodium silicate (weight ratio of $SiO_2/Na_2O$ is 3.25 /1) at a concentration of 400 g. of $SiO_2$ per liter is gradually added with agitation in an amount sufficient to provide the percent of dense $SiO_2$ shown in Table I. Maintaining the temperature at about 90° C., a 10% by weight aqueous solution of $H_2SO_4$ is added to the slurry over a period of about one hour until the pH of the slurry drops to from 7.3 to 7.6. Then additional sodium silicate solution (described above) is added to the slurry in an amount sufficient to provide the percent of porous $SiO_2$ shown in Table I. During the addition of the sodium silicate solution the pH of the slurry is maintained between 5 and 7 by the simultaneous addition of 96% $H_2SO_4$. After the addition the slurry is allowed to stand for 30 minutes. Then 96% sulfuric acid and a sodium aluminate solution containing 383 g./l. of $Al_2O_3$ are simultaneously added at rates which maintain the pH of the slurry between 6 and 8. The sodium aluminate solution is added in an amount sufficient to provide the percent of $Al_2O_3$ shown in Table I. The pH of the slurry is then adjusted to from 7.5 to 8.0. The pigment is recovered by filtering, washing, drying at about 120° C., and micronizing. The properties of the pigments so prepared and the Controls are shown in Table I.

EXAMPLES 19-27

Four thousand grams of pigmentary $TiO_2$ is slurried in sufficient water to achieve 300 g. $TiO_2$ per liter. The slurry is heated to 90° C. and the pH is adjusted to 9.5 with a 50% by weight aqueous solution of sodium hydroxide. At this temperature a solution of sodium silicate, described in Example 1, at a concentration of 200 g. of $SiO_2$ per liter is gradually added with agitation in an amount sufficient to provide the percent of dense silica shown in Table II. Maintaining the temperature at about 90° C., a 5% by weight aqueous solution of $H_2SO_4$ is added to the slurry over a period of about 2 hours until the pH of the slurry drops to from 7.3 to 7.6. The slurry is maintained at about 90° C. for 30 minutes. Then 50% sulfuric acid and a sodium aluminate solution containing 370 g./l. of $Al_2O_3$ are silumtaneously added at rates which maintain the pH of the slurry between 8 and 9. The sodium aluminate solution is added in an amount to provide the percent of $Al_2O_3$ shown in the third column of Table II. Then additional sodium silicate solution, described above, is added to the slurry in an amount sufficient to provide the percent of porous $SiO_2$ shown in Table II. During the addition of the sodium silicate solution the pH of the slurry is maintained between 8 and 9 by the simultaneous addition of 50% $H_2SO_4$. To the amount of additional $Al_2O_3$ shown in the fifth column of Table II, 50% sulfuric acid and the sodium aluminate solution, described above, are simultaneously added at rates which maintain the pH of the slurry between 8 and 9. Then the slurry is cured for 30 minutes at about 90° C. The pH of the slurry is then adjusted to about 7. The pigment is recovered in the manner described in Example 1. All the pigments exhibit good hiding power with respect to the indoor and outdoor standards. The performance properties of the pigments so prepared and controls are shown in Table II. In addition to the standard Controls, i.e., Controls A and B, Control C, containing multiple coatings of porous silica and alumina and prepared according to U.S. Pat. No. 3,897,261, is shown for comparison.

TABLE I

| Example | Coating Composition, % | | | Acid Solubility | Hiding Power | | Tinting Strength |
|---|---|---|---|---|---|---|---|
| | Dense $SiO_2$ | Porous $SiO_2$ | $Al_2O_3$ | | Indoor | Outdoor | |
| 1 | 6 | 10 | 5.25 | 1.2 | 99 | 107 | 108 |
| 2 | 1 | 10 | 5.25 | 16.5 | 112 | 110 | 111 |
| 3 | 6 | 5 | 10.00 | 2.7 | 105 | 108 | 108 |
| 4 | 6 | 5 | 0.50 | 2.4 | 93 | 93 | 95 |
| 5 | 1 | 5 | 10.00 | 18.5 | 107 | 105 | 104 |
| 6 | 1 | 5 | 0.50 | 20.2 | 94 | 103 | 86 |
| 7 | 3.5 | 10 | 10.00 | 2.2 | 105 | 104 | 117 |
| 8 | 3.5 | 10 | 0.50 | 2.7 | 97 | 110 | 99 |
| 9 | 3.5 | 5 | 5.25 | 3.3 | 103 | 112 | 117 |
| 10 | 3.5 | 5 | 5.25 | 2.3 | 107 | 108 | 115 |
| 11 | 3.5 | 5 | 5.25 | 1.7 | 106 | 104 | 109 |
| 12 | 1 | 14 | 6.50 | 2.5 | — | — | 109 |
| 13 | 3 | 12 | 6.50 | 2.3 | — | — | 101 |
| 14 | 5 | 10 | 6.50 | 1.5 | — | — | 102 |
| 15 | 7 | 8 | 6.50 | 2.2 | — | — | 97 |
| 16 | 3.5 | 0.5 | 0.50 | 4.5 | 74 | 91 | 67 |
| 17 | 6.0 | 0.5 | 5.25 | 2.3 | 88 | 89 | 75 |
| 18 | 3.5 | 0.5 | 10.0 | 3.5 | 103 | 102 | 78 |
| Control A | 8 | 0 | 2.00 | 3.8 | 77 | 100 | 72 |
| Control B | 0 | 7 | 6.00 | 22.5 | 100 | 112 | 100 |

TABLE II

| Example | Coating Composition, % | | | $Al_2O_3$ | Acid Solubility | Chalk/Fade Index (Exposure-25 months) | Indoor Hiding Power |
|---|---|---|---|---|---|---|---|
| | Dense $SiO_2$ | $Al_2O_3$ | Porous $SiO_2$ | | | | |
| 19 | 4 | 0 | 2.0 | 4.0 | 1.0 | 36 | 103 |
| 20 | 4 | 0.0 | 5.0 | 1.0 | 1.9 | 34 | 96 |
| 21 | 4 | 3.0 | 2.0 | 1.0 | 1.7 | 36 | 103 |
| 22 | 4 | 1.5 | 3.5 | 1.0 | 1.8 | 33 | 107 |

TABLE II-continued

| Example | Coating Composition, % | | | | Acid Solubility | Chalk/Fade Index (Exposure-25 months) | Indoor Hiding Power |
|---|---|---|---|---|---|---|---|
| | Dense SiO$_2$ | Al$_2$O$_3$ | Porous SiO$_2$ | Al$_2$O$_3$ | | | |
| 23 | 4 | 1.5 | 2.0 | 2.5 | 1.8 | 34 | 106 |
| 24 | 4 | 0 | 3.5 | 2.5 | 1.8 | 35 | 101 |
| 25 | 4 | 1.0 | 3.0 | 2.0 | 1.8 | 36 | 103 |
| 26 | 4 | 1.0 | 4.0 | 1.0 | 1.9 | 34 | 95 |
| 27 | 4 | 13.0 | 5.0 | 0 | 1.6 | 37* | 107 |
| Control A | 8 | 2 | 0 | 0 | 3.8 | 34* | 77 |
| Control B | 0 | 0 | 7 | 6 | 22.5 | 21* | 100 |
| Control C | 2.5** | 2.5 | 6.5 | 27.4 | 29* | 112 | |

*Exposure - 14 months
**Porous Silica

What is claimed is:

1. Coated TiO$_2$ pigment consisting essentially of a core of pigmentary TiO$_2$, a dense inner coating of from 1% to 10% by weight of dense amorphous silica, calculated as SiO$_2$ and based on said pigmentary TiO$_2$, and from 0% to 5% by weight of alumina, calculated as Al$_2$O$_3$ and based on said pigmentary TiO$_2$, and a porous outer coating of porous silica and alumina, said porous silica being present in an amount from 0.5% to 15% by weight, calculated as SiO$_2$ and based on said pigmentary TiO$_2$, said alumina being present in an amount from 0% to 15% by weight, calculated as Al$_2$O$_3$ and based on said pigmentary TiO$_2$, wherein the total amount of alumina is at least 0.5% by weight, calculated as Al$_2$O$_3$ and based on said pigmentary TiO$_2$, wherein said dense amorphous silica and said porous silica and alumina substantially continuously coat said pigmentary TiO$_2$.

2. Coated TiO$_2$ pigment according to claim 1 wherein said dense amorphous silica of said inner coating is present in an amount from 3.5% to 6% by weight.

3. Coated TiO$_2$ pigment according to claim 2 wherein the alumina of said inner coating is present in an amount from 1 to 3% by weight.

4. Coated TiO$_2$ pigment according to claim 1 wherein said porous silica in said outer coating is present in an amount from 5 to 10% by weight and wherein said alumina in said outer coating is present in an amount from 5 to 10% by weight.

5. Coated TiO$_2$ pigment according to claim 1 wherein said dense amorphous silica of said inner coating is present in an amount of about 3.5% by weight, said alumina in said outer coating is present in an amount of about 5.25% by weight, and said porous silica in said outer coating is present in an amount of about 5% by weight.

6. Process for preparing coated TiO$_2$ pigment by the steps of
   (i) adjusting the pH of an aqueous slurry of pigmentary TiO$_2$ to from about 9 to 10 at a temperature from 80° C. to 90° C.,
   (ii) adding to said slurry an aqueous solution of soluble silicate in an amount calculated to provide from 1% to 10% by weight of silica, calculated as SiO$_2$ and based on said pigmentary TiO$_2$ while maintaining a temperature from 80° C. to 90° C.,
   (iii) slowly adding dilute aqueous acid to said slurry until the pH of said slurry is from 6 to 7.7 while maintaining a temperature from 80° C. to 90° C. during the addition of said acid and for at least 30 minutes thereafter,
   (iv) adding to said slurry, maintained at a pH from 5 to 9, an aqueous solution of a soluble silicate in an amount calculated to provide from 0.5% to 15% by weight of silica, calculated as SiO$_2$ and based on said pigmentary TiO$_2$,
   (v) adding to said slurry, maintained at a pH from 4 to 9, an aqueous solution of soluble aluminate in an amount calculated to provide from 0.5% to 15% by weight of alumina, calculated as Al$_2$O$_3$ and based on said pigmentary TiO$_2$,
   (vi) adjusting the pH of said slurry to from 7 to 9, and
   (vii) separating the resulting coated TiO$_2$ pigment from said slurry.

7. Process for preparing coated TiO$_2$ pigment according to claim 6 wherein said slurry is cured for at least 30 minutes prior to step (v).

8. Process for preparing coated TiO$_2$ pigment according to claim 6 wherein in step (iii) the pH of said slurry is from 7.3 to 7.6, in step (iv) the pH of said slurry is maintained from 5 to 7, in step (v) the pH of said slurry is maintained from 6 to 8, and in step (vi) the pH of said slurry is adjusted to from 7.5 to 8.0.

9. Process fo preparing coated TiO$_2$ pigment by the steps of
   (i) adjusting the pH of an aqueous slurry of pigmentary TiO$_2$ to from about 9 to 10 at a temperature from 80° C. to 90° C.,
   (ii) adding to said slurry an aqueous solution of soluble silicate in an amount calculated to provide from 1% to 10% by weight of silica, calculated as SiO$_2$ and based on said pigmentary TiO$_2$, while maintaining a temperature from 80° C. to 90° C.,
   (iii) slowly adding dilute aqueous acid to said slurry until the pH of said slurry is from 6 to 7.7 while maintaining a temperature from 80° C. to 90° C. during the addition of said acid and for at least 30 minutes thereafter,
   (iiia) adding to said slurry, maintained at a pH from 4 to 9, an aqueous solution of soluble aluminate in an amount calculated to provide from 0.5 to 15% by weight of alumina, calculated as Al$_2$O$_3$ and based on said pigmentary TiO$_2$,
   (iv) adding to said slurry, maintained at a pH from 5 to 9, an aqueous solution of a soluble silicate in an amount calculated to provide from 0.5 to 15% by weight of silica, calculated as SiO$_2$ and based on said pigmentary TiO$_2$,
   (v) adding to said slurry, maintained at a pH from 4 to 9, an aqueous solution of soluble aluminate in an amount calculated to provide from 0.5% to 15% by weight of alumina, calculated as Al$_2$O$_3$ and based on said pigmentary TiO$_2$,
   (vi) adjusting the pH of said slurry to from 7 to 9, and
   (vii) separating the resulting coated TiO$_2$ pigment from said slurry.

10. Process for preparing coated TiO$_2$ pigment by the steps of (i) adjusting the pH of an aqueous slurry of pigmentary $TiO_2$ to from about 9 to 10 at a temperature from 80° C. to 90° C.,
(ii) adding to said slurry an aqueous solution of soluble silicate in an amount calculated to provide from 1% to 10% by weight of silica, calculated as $SiO_2$ and based on said pigmentary $TiO_2$ while maintaining a temperature from 80° C. to 90° C.,
(iii) slowly adding dilute aqueous acid to said slurry until the pH of said slurry is from 6 to 7.7 while maintaining a temperature from 80° C. to 90° C. during the addition of said acid and for at least 30 minutes thereafter,
(iiia) adding to said slurry, maintained at a pH from 4 to 9, an aqueous solution of soluble aluminate in an amount calculated to provide from 0.5 to 15% by weight of alumina, calculated as $Al_2O_3$ and based on said pigmentary $TiO_2$,
(iv) adding to said slurry maintained at a pH from 5 to 9, an aqueous solution of a soluble silicate in an amount calculated to provide from 0.5 to 15% by weight of silica, calculated as $SiO_2$ and based on said pigmentary $TiO_2$,
(vi) adjusting the pH of said slurry to from 7 to 9, and
(vii) separating the resulting coated $TiO_2$ pigment from said slurry.

* * * * *